(12) United States Patent
Liu et al.

(10) Patent No.: US 11,361,577 B2
(45) Date of Patent: Jun. 14, 2022

(54) ULTRASONIC FINGERPRINT IDENTIFICATION CIRCUIT, DRIVING METHOD THEREOF, AND FINGERPRINT IDENTIFICATION DEVICE

(71) Applicant: BOE TECHNOLOGY GROUP CO., LTD., Beijing (CN)

(72) Inventors: Yingming Liu, Beijing (CN); Xiaochuan Chen, Beijing (CN); Haisheng Wang, Beijing (CN); Xiaoliang Ding, Beijing (CN); Lei Wang, Beijing (CN); Changfeng Li, Beijing (CN); Xiufeng Li, Beijing (CN); Chenyang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/264,013

(22) PCT Filed: Jun. 10, 2020

(86) PCT No.: PCT/CN2020/095242
§ 371 (c)(1),
(2) Date: Jan. 28, 2021

(87) PCT Pub. No.: WO2020/248986
PCT Pub. Date: Dec. 17, 2020

(65) Prior Publication Data
US 2021/0295004 A1 Sep. 23, 2021

(30) Foreign Application Priority Data
Jun. 11, 2019 (CN) .......................... 201910501914.9

(51) Int. Cl.
*G06V 40/13* (2022.01)

(52) U.S. Cl.
CPC ...... *G06V 40/1306* (2022.01); *G06V 40/1318* (2022.01)

(58) Field of Classification Search
CPC .............. G06K 9/0002; G06K 9/0004; G06V 40/1306; G06V 40/1318
See application file for complete search history.

(56) References Cited

U.S. PATENT DOCUMENTS

2015/0357375 A1 12/2015 Tsai et al.
2017/0110504 A1* 4/2017 Panchawagh ......... H01L 41/311
(Continued)

FOREIGN PATENT DOCUMENTS

CN 106663202 A 5/2017
CN 106896963 A 6/2017
(Continued)

OTHER PUBLICATIONS

First office action issued in Chinese Patent Application No. 201910501914.9 with search report.

*Primary Examiner* — Premal R Patel
(74) *Attorney, Agent, or Firm* — Chiwin Law LLC (57) ABSTRACT

Embodiments of the present disclosure provide an ultrasonic fingerprint identification circuit, a driving method thereof, and a fingerprint identification device. The circuit includes a transmitting electrode, a receiving electrode, a piezoelectric layer disposed between the transmitting electrode and the receiving electrode, and a signal output unit, the transmitting electrode is configured to receive an alternating current signal in a transmitting stage; the receiving electrode is connected with the signal output unit. The circuit further includes a photosensitive unit, with an anode connected with the receiving electrode and a cathode connected with a first fixed electric level so that the photosensitive unit is in a reverse bias state.

20 Claims, 4 Drawing Sheets

(56) References Cited

U.S. PATENT DOCUMENTS

| | | |
|---|---|---|
| 2018/0121699 A1 | 5/2018 | Zhang et al. |
| 2019/0050618 A1 | 2/2019 | Khuri-Yakub et al. |
| 2019/0279566 A1 | 9/2019 | Wang et al. |
| 2020/0050322 A1 | 2/2020 | Liu et al. |
| 2020/0218392 A1 | 7/2020 | He et al. |

FOREIGN PATENT DOCUMENTS

| | | |
|---|---|---|
| CN | 107204172 A | 9/2017 |
| CN | 107220630 A | 9/2017 |
| CN | 107330411 A | 11/2017 |
| CN | 107958243 A | 4/2018 |
| CN | 108363993 A | 8/2018 |
| CN | 108399352 A | 8/2018 |
| CN | 109154959 A | 1/2019 |
| CN | 109598258 A | 4/2019 |
| CN | 110210442 A | 9/2019 |

* cited by examiner

In the transmitting stage, the reset stage and the receiving stage, maintaining the cathode of the photosensitive unit to be connected with the first fixed electric level, so that the photosensitive unit is in the reverse bias state ~501

FIG. 5

In the transmitting stage, maintaining the cathode of the photosensitive unit to be connected with the first fixed electric level, so that the photosensitive unit is in the reverse bias state; receiving the alternating current signal through the transmitting electrode, inputting the second voltage to the receiving electrode through an input unit, and transmitting the ultrasonic signal in response to the alternating current signal at the transmitting electrode and the second voltage at the receiving electrode through the piezoelectric layer ~601

In the reset stage, maintaining the cathode of the photosensitive unit to be connected with the first fixed electric level, so that the photosensitive unit is in the reverse bias state, inputting a first voltage to the piezoelectric layer through the transmitting electrode, and resetting the receiving electrode through the reset unit ~602

In the receiving stage, maintaining the cathode of the photosensitive unit to be connected with the first fixed electric level, so that the photosensitive unit is in the reverse bias state, inputting the first voltage to the piezoelectric layer through the transmitting electrode, generating a first valley signal or a first ridge signal in response to the ultrasonic signal reflected by a fingerprint and the first voltage through the piezoelectric layer, outputting the first valley signal or the first ridge signal to the signal output unit through the receiving electrode, generating an optical signal in response to light reflected by the fingerprint and the first fixed electric level through the photosensitive unit, outputting the optical signal to the signal output unit through the receiving electrode, and outputting a second valley signal obtained by superimposing the first valley signal and the optical signal or a second ridge signal obtained by superimposing the first ridge signal and the optical signal through the signal output unit, wherein the first fixed electric level is greater than the second voltage ~603

ULTRASONIC FINGERPRINT IDENTIFICATION CIRCUIT, DRIVING METHOD THEREOF, AND FINGERPRINT IDENTIFICATION DEVICE

This application is a U.S. National Phase Entry of International Application No. PCT/CN2020/095242 filed on Jun. 10, 2020, designating the United States of America and claiming priority to Chinese Patent Application No. 201910501914.9, filed on Jun. 11, 2019. The present application claims priority to and the benefit of the above-identified applications and the above-identified applications are incorporated by reference herein in their entirety.

TECHNICAL FIELD

Embodiments of the present disclosure relate to an ultrasonic fingerprint identification circuit, a driving method thereof, and a fingerprint identification device.

BACKGROUND

Fingerprint identification technology can authenticate users via fingerprints, thus improving the security of display devices. As a new fingerprint identification technology, the ultrasonic fingerprint identification technology has gradually attracted wide attentions. Fingerprints can be identified even in the case where there are water stains and smears on the finger surface because of the strong penetrability of ultrasonic waves, which makes the application of ultrasonic fingerprint identification technology more and more extensive.

At present, the ultrasonic fingerprint identification method needs to use the valley-ridge differential signal formed by the reflection of ultrasonic waves from ridges and valleys of a finger to form fingerprint images. The larger the valley-ridge differential signal is, the better it is to form a clear fingerprint image, and the better it is to improve the accuracy of fingerprint identification.

SUMMARY

Embodiments of the present disclosure provide an ultrasonic fingerprint identification circuit, a driving method thereof, and a fingerprint identification device, which can improve the accuracy of fingerprint identification using an ultrasonic fingerprint identification circuit.

Embodiments of the present disclosure provide an ultrasonic fingerprint identification circuit, including: a transmitting electrode, a receiving electrode, a piezoelectric layer disposed between the transmitting electrode and the receiving electrode, a signal output unit and a photosensitive unit, wherein the transmitting electrode is configured to receive an alternating current signal in a transmitting stage; the receiving electrode is connected with the signal output unit and is applied with a second voltage in the transmitting stage; the piezoelectric layer is configured to transmit an ultrasonic signal in response to the alternating current signal at the transmitting electrode and the second voltage at the receiving electrode, in the transmitting stage; and an anode of the photosensitive unit is connected with the receiving electrode, and a cathode of the photosensitive unit is connected with a first fixed electric level, so that the photosensitive unit is in a reverse bias state.

Optionally, the ultrasonic fingerprint identification circuit further includes an input unit and a reset unit; the input unit is connected with the receiving electrode; the reset unit is connected with the receiving electrode; the transmitting electrode is further configured to input a first voltage to the piezoelectric layer in a reset stage and a receiving stage; the input unit is configured to input the second voltage to the receiving electrode in the transmitting stage, and the first fixed electric level is greater than the second voltage; the piezoelectric layer is further configured to generate a first valley signal or a first ridge signal in response to the ultrasonic signal reflected by a fingerprint and the first voltage in the receiving stage, and to output the first valley signal or the first ridge signal to the signal output unit through the receiving electrode; the reset unit is configured to reset the receiving electrode in the reset stage; the photosensitive unit is configured to generate an optical signal in response to light reflected by the fingerprint and the first fixed electric level in the receiving stage, and to output the optical signal to the signal output unit through the receiving electrode; and the signal output unit is configured to output a second valley signal obtained by superimposing the first valley signal and the optical signal or output a second ridge signal obtained by superimposing the first ridge signal and the optical signal, in the receiving stage.

Optionally, the signal output unit includes a first thin film transistor and a second thin film transistor, a first electrode of the first thin film transistor is connected with a first voltage input terminal, a gate electrode of the first thin film transistor is connected with the receiving electrode, a second electrode of the first thin film transistor is connected with a first electrode of the second thin film transistor, a gate electrode of the second thin film transistor is connected with a second voltage input terminal, a second electrode of the second thin film transistor is connected with an output terminal of the signal output unit, wherein the first voltage input terminal is configured to input a fourth voltage Vcc to the first electrode of the first thin film transistor in the transmitting stage, the reset stage and the receiving stage; and the second voltage input terminal is configured to input a fifth voltage to the gate electrode of the second thin film transistor to turn on the second thin film transistor in the receiving stage.

Optionally, the photosensitive unit includes at least one photosensitive diode, an anode of each of the at least one photosensitive diode is connected with the receiving electrode, the anode of each of the at least one photosensitive diode is further connected with the gate electrode of the first thin film transistor, and a cathode of each of the at least one photosensitive diode is connected with the first fixed electric level.

Optionally, the at least one photodiode is a PIN-type photodiode.

Optionally, the input unit includes a third thin film transistor, a first electrode of the third thin film transistor is connected with the receiving electrode, a second electrode of the third thin film transistor is connected with a third voltage input terminal, and a gate electrode of the third thin film transistor is connected with a fourth voltage input terminal, wherein the fourth voltage input terminal is configured to input a sixth voltage to the gate electrode of the third thin film transistor to turn on the third thin film transistor in the transmitting stage; and the third voltage input terminal is configured to input the second voltage to the receiving electrode through the third thin film transistor in a case where the third thin film transistor is turned on.

Optionally, the reset unit includes a non-photosensitive diode, a cathode of the non-photosensitive diode is connected with the receiving electrode, and an anode of the non-photosensitive diode is connected with the third voltage input terminal, and the third voltage input terminal is further configured to input a third voltage into the non-photosensitive diode in the reset stage, so as to input the third voltage into the receiving electrode through the non-photosensitive diode, wherein the third voltage is greater than the second voltage.

Optionally, a material of the piezoelectric layer includes at least one selected from the group consisting of polyvinylidene fluoride (PVDF), aluminum nitride (AlN), lead zirconate titanate (PZT) and zinc oxide (ZnO).

Embodiments of the present disclosure further provide a fingerprint identification device, including a plurality of ultrasonic fingerprint identification circuits described above, wherein receiving electrodes of the plurality of ultrasonic fingerprint identification circuits are arranged separately from each other.

Optionally, the fingerprint identification device includes a substrate, the plurality of ultrasonic fingerprint identification circuits are arranged on one side of the substrate, and a display module is attached to one side of the substrate away from the plurality of ultrasonic fingerprint identification circuits, and the receiving electrodes of the plurality of ultrasonic fingerprint identification circuits are arranged in one-to-one correspondence with pixel units included in the display module.

Optionally, the plurality of ultrasonic fingerprint identification circuits share an output terminal of the signal output unit.

Embodiments of the present disclosure further provide a driving method of an ultrasonic fingerprint identification circuit applicable for the ultrasonic fingerprint identification circuit described above, including: in the transmitting stage, a reset stage and a receiving stage, maintaining the cathode of the photosensitive unit to be connected with the first fixed electric level, so that the photosensitive unit is in the reverse bias state.

Optionally, the driving method further includes: in the transmitting stage, receiving the alternating current signal through the transmitting electrode, inputting the second voltage to the receiving electrode through an input unit, and transmitting the ultrasonic signal in response to the alternating current signal at the transmitting electrode and the second voltage at the receiving electrode through the piezoelectric layer; in the reset stage, inputting a first voltage to the piezoelectric layer through the transmitting electrode, and resetting the receiving electrode through the reset unit; and in the receiving stage, inputting the first voltage to the piezoelectric layer through the transmitting electrode, generating a first valley signal or a first ridge signal in response to the ultrasonic signal reflected by a fingerprint and the first voltage through the piezoelectric layer, outputting the first valley signal or the first ridge signal to the signal output unit through the receiving electrode, generating an optical signal in response to light reflected by the fingerprint and the first fixed electric level through the photosensitive unit, outputting the optical signal to the signal output unit through the receiving electrode, and outputting a second valley signal obtained by superimposing the first valley signal and the optical signal or a second ridge signal obtained by superimposing the first ridge signal and the optical signal through the signal output unit, wherein the first fixed electric level is greater than the second voltage.

Optionally, resetting the receiving electrode through the reset unit includes: inputting a third voltage to the reset unit; and inputting the third voltage to the receiving electrode through the reset unit to reset the receiving electrode.

Optionally, the third voltage is greater than the second voltage.

Optionally, the first fixed electric level is greater than the third voltage.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure. In the drawings:

FIG. 5 is a flowchart of an example of a driving method of an ultrasonic fingerprint identification circuit provided by an embodiment of the present disclosure;

FIG. 6 is a flowchart of another example of a driving method of an ultrasonic fingerprint identification circuit provided by an embodiment of the present disclosure.

DETAILED DESCRIPTION

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
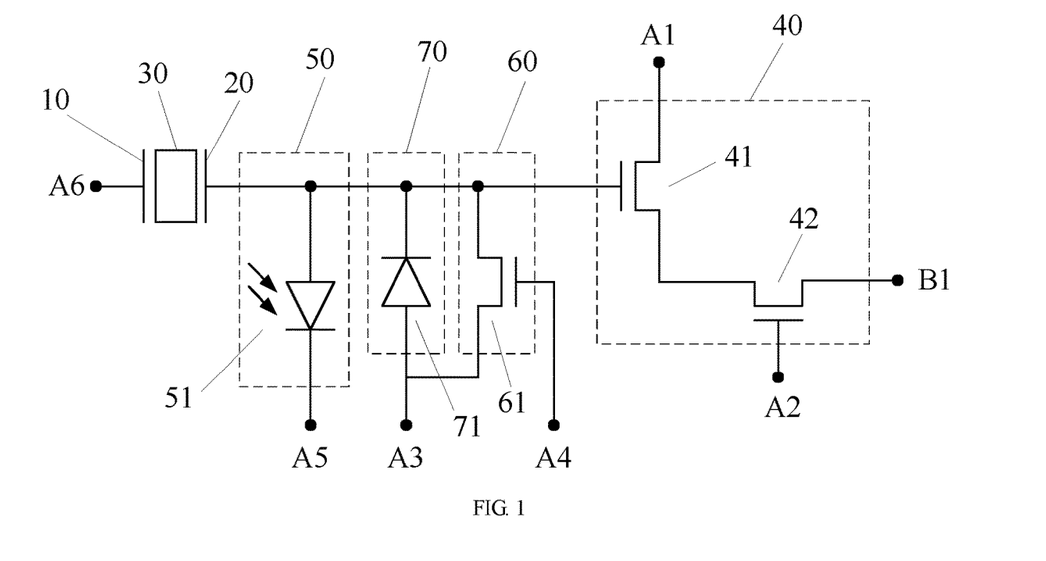
FIG. 1 is a schematic diagram of an example of an ultrasonic fingerprint identification circuit provided by an embodiment of the present disclosure.

FIG. 1 shows a schematic diagram of an ultrasonic fingerprint identification circuit provided by an embodiment of the present disclosure. Referring to FIG. 1, the ultrasonic fingerprint identification circuit in the present embodiment includes a transmitting electrode 10 and a receiving electrode 20, a piezoelectric layer 30 is arranged between the transmitting electrode 10 and the receiving electrode 20, and the transmitting electrode 10 can be configured to receive an alternating current signal in a transmitting stage. In addition, the receiving electrode 20 can be connected with a signal output unit 40. The ultrasonic fingerprint identification circuit further includes a photosensitive unit 50, an anode of the photosensitive unit 50 can be connected with the receiving electrode 20, and a cathode of the photosensitive unit 50 can be connected with a first fixed electric level A5.

As shown in FIG. 1, the ultrasonic fingerprint identification circuit can further include an input unit 60 and a reset unit 70. The input unit 60 is connected with the receiving electrode 20, the reset unit 70 is connected with the receiving electrode 20, and the anode of the photosensitive unit 50 can also be connected with the signal output unit 40 through the receiving electrode 20.

In practical application, the transmitting electrode 10 can be configured to receive an alternating current signal in the transmitting stage and to input a first voltage to the piezoelectric layer 30 in a reset stage and a receiving stage. The alternating current signal can be input through a sixth voltage input terminal A6. The input unit 60 can be configured to input a second voltage to the receiving electrode 20 in the transmitting stage, wherein the first fixed electric level is greater than the second voltage. The piezoelectric layer 30 can be configured to transmit, in the transmitting stage, an ultrasonic signal in response to the alternating current signal at the transmitting electrode 10 and the second voltage at the receiving electrode 20, and to generate, in the receiving stage, a first valley signal or a first ridge signal in response to the ultrasonic signal reflected by a fingerprint and the first voltage and output the first valley signal or the first ridge signal to the signal output unit 40 through the receiving electrode 20. The reset unit 70 can be configured to reset the receiving electrode 20 in the reset stage. The photosensitive unit 50 can be configured to generate, in the receiving stage, an optical signal in response to light reflected by the fingerprint and the first fixed electric level, and to output the optical signal to the signal output unit 40 through the receiving electrode 20. The signal output unit 40 can be configured to output, in the receiving stage, a second valley signal obtained by superimposing the first valley signal and the optical signal or a second ridge signal obtained by superimposing the first ridge signal and the optical signal.

As described above, in the present embodiment, the operating process of the ultrasonic fingerprint identification circuit can include the transmitting stage, the reset stage and the receiving stage.

For example, in the transmitting stage, the piezoelectric layer 30 can vibrate under the combined action of the alternating current signal at the transmitting electrode 10 and the second voltage at the receiving electrode 20 according to piezoelectric characteristics, thereby generating an ultrasonic signal and transmitting it. Optionally, the material of the piezoelectric layer 30 can include at least one selected from the group consisting of PVDF (polyvinylidene fluoride), AlN (aluminum nitride), PZT (lead zirconate titanate) and ZnO (zinc oxide); the material of the transmitting electrode 10 can be a metallic material, such as silver; and the material of the receiving electrode 20 can be ITO (indium tin oxide), etc., without being specifically limited in the embodiments of the present disclosure.

For example, after the ultrasonic signal is transmitted, the reset stage is entered, and the reset unit 70 can reset the receiving electrode 20 in this stage. Before the ultrasonic signal reflected by the fingerprint reaches the receiving electrode 20, an ultrasonic signal may be reflected back by other film layers between the fingerprint and the receiving electrode, and therefore, the receiving electrode 20 can be reset in the reset stage before the receiving stage, thus avoiding the influence of noise signals reflected by other film layers to be acted on the receiving of the ultrasonic signal reflected by the fingerprint.

For example, when the ultrasonic signal reaches a user's finger, the ridge part and the valley part of the fingerprint can reflect the ultrasonic signal. After the receiving electrode 20 is reset, the receiving stage is entered, and in this stage, when the ultrasonic signal reflected by the fingerprint reaches the piezoelectric layer, the piezoelectric layer can vibrate and generate a voltage change relative to the first voltage at the interface of the piezoelectric layer. The voltage change is the first valley signal when it is caused by the valley in the fingerprint, and the voltage change is the first ridge signal when it is caused by the ridge in the fingerprint. The first valley signal or the first ridge signal generated by the piezoelectric layer 30 can be received by the receiving electrode 20, and then the receiving electrode 20 can transmit the first valley signal or the first ridge signal to the signal output unit 40.

In addition, in the receiving stage, the fingerprint can also reflect a part of light. For example, the fingerprint identification device can be attached with a display module, and the fingerprint identification device can be arranged close to the substrate of the display module, so that the fingerprint can reflect the light emitted by the display module. Therefore, the photosensitive unit 50 can generate an optical signal relative to the first fixed electric level in response to the light reflected by the fingerprint, so that the signal output unit 40 can receive a second valley signal formed by superimposing the first valley signal and the optical signal or a second ridge signal formed by superimposing the first ridge signal and the optical signal. There is a certain gap between the valley in the fingerprint and a corresponding touched position while the ridge is almost closely contacted with the corresponding touched position, so the amount of light reflected by the valley in the fingerprint is greater than the amount of light reflected by the ridge in the fingerprint. Therefore, the intensity of the optical signal generated by light reflected by the valley in the fingerprint is greater than the intensity of the optical signal generated by light reflected by the ridge in the fingerprint, so the signal difference between the second valley signal and the second ridge signal will be greater than the signal difference between the first valley signal and the first ridge signal. In this way, the difference between the second valley signal and the second ridge signal will be widened, thus improving the accuracy of fingerprint identification.

Referring to FIG. 1, in an optional implementation, the signal output unit 40 may include a first thin film transistor 41 and a second thin film transistor 42, and a first electrode of the first thin film transistor 41 can be connected with a first voltage input terminal A1. For example, the first voltage input terminal A1 can input a fourth voltage Vcc to the first electrode of the first thin film transistor 41 in the transmitting stage, the reset stage and the receiving stage. The gate electrode of the first thin film transistor 41 can be connected with the receiving electrode 20, the second electrode of the first thin film transistor 41 can be connected with the first electrode of the second thin film transistor 42, the gate electrode of the second thin film transistor 42 can be connected with a second voltage input terminal A2, and the second electrode of the second thin film transistor 42 can be connected with an output terminal B1 of the signal output unit 40. The second voltage input terminal A2 can input a fifth voltage Vgate1 to the gate electrode of the second thin film transistor 42 to turn on the second thin film transistor 42, in the receiving stage, so that the second valley signal or the second ridge signal is output from the output terminal B1.

In practical application, one output terminal B1 can be shared by more than two ultrasonic fingerprint identification circuits, Therefore, a second thin film transistor 42 can be arranged between the second electrode of the first thin film transistor 41 and the output terminal B1, so that the output terminal B1 can be controlled to output the second valley signals or the second ridge signals of different ultrasonic fingerprint identification circuits by controlling the turn-on and turn-off of the second thin film transistors 42 in different ultrasonic fingerprint identification circuits.

Figure 2:
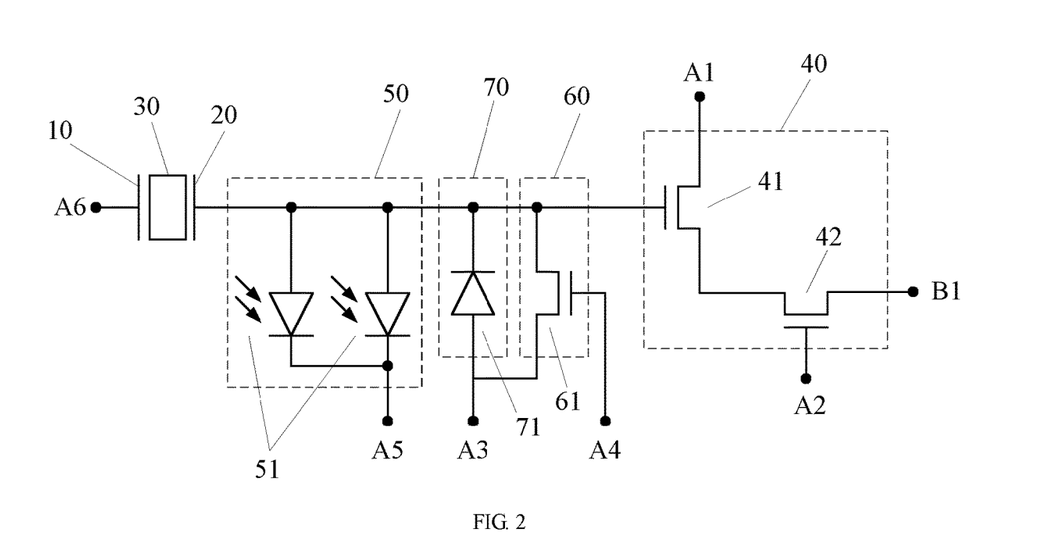
FIG. 2 is a schematic diagram of another example of an ultrasonic fingerprint identification circuit provided by an embodiment of the present disclosure.

Optionally, the photosensitive unit 50 can include at least one photodiode 51. As shown in FIG. 1 and FIG. 2, the photosensitive unit 50 shown in FIG. 1 includes one photodiode 51, and the photosensitive unit 10 shown in FIG. 2 includes two photodiodes 51. Referring to FIG. 1 and FIG. 2, the anode of each photodiode 51 can be connected with the receiving electrode 20, the anode of each photodiode 51 can also be connected with the gate electrode of the first thin film transistor 41, and the cathode of each photodiode 51 can be connected with the first fixed electric level A5. That is, in the case where more than two photodiodes 51 are included in the photosensitive unit 50, these photodiodes 51 are substantially in parallel connection. In the receiving stage, the optical signal generated by each photodiode 51 can be output to the signal output unit 40.

In practical application, the more the number of the photodiodes 51, the greater the difference between the second valley signal and the second ridge signal, and the higher the accuracy of fingerprint identification; however, the less the number of the photodiodes 51, the simpler the manufacturing method of the ultrasonic fingerprint identification circuit. Therefore, in practical application, the number of photodiodes 51 can be determined according to the accuracy requirement of fingerprint identification.

Optionally, the photodiode 51 can be a PIN-type photodiode, without being specifically limited in the embodiments of the present disclosure.

Optionally, referring to FIG. 1, the input unit 60 can include a third thin film transistor 61, the first electrode of the third thin film transistor 61 is connected with the receiving electrode 20, the second electrode of the third thin film transistor 61 is connected with a third voltage input terminal A3, and the gate electrode of the third thin film transistor 61 is connected with a fourth voltage input terminal A4. For example, in the transmitting stage, the fourth voltage input terminal A4 can input a sixth voltage Vgate2 to the gate electrode of the third thin film transistor 61 to turn on the third thin film transistor 61. In the case where the third thin film transistor 61 is turned on, the third voltage input terminal A3 can input a second voltage Vref1 to the receiving electrode 20 through the third thin film transistor 61.

Optionally, referring to FIG. 1, the reset unit 70 can include a non-photosensitive diode 71, the non-photosensitive diode 71 has unidirectional conduction characteristics and is insensitive to light. The cathode of the non-photosensitive diode 71 can be connected with the receiving electrode 20, and the anode of the non-photosensitive diode 71 can be connected with the third voltage input terminal A3. That is, the conduction directions of the reset unit 70 and the photosensitive unit 50 are opposite to each other. For example, in the reset stage, the third voltage input terminal A3 can input a third voltage Vref2 to the non-photosensitive diode 71, and then the non-photosensitive diode 71 can input the third voltage Vref2 to the receiving electrode 20, thereby resetting the receiving electrode 20.

In the embodiment of the present disclosure, the anode of the photosensitive unit can be connected with the receiving electrode, and the cathode of the photosensitive unit can be connected with the first fixed electric level, so that the photosensitive unit is in a reverse bias state. The fingerprint can reflect light while reflecting the ultrasonic signal, and therefore, the photosensitive unit can generate an optical signal in response to the light reflected by the fingerprint and the first fixed electric level. The optical signal can be superimposed with the first valley signal or the first ridge signal obtained by the receiving electrode based on the ultrasonic signal reflected by the fingerprint, thereby obtaining a superimposed second valley signal or a superimposed second ridge signal. Because the amount of light reflected by the valley in the fingerprint is greater than the amount of light reflected by the ridge in the fingerprint, the signal difference between the second valley signal and the second ridge signal will be greater than the signal difference between the first valley signal and the first ridge signal. In this way, the difference between the second valley signal and the second ridge signal can be widened, thus improving the accuracy of fingerprint identification.

Figure 3:
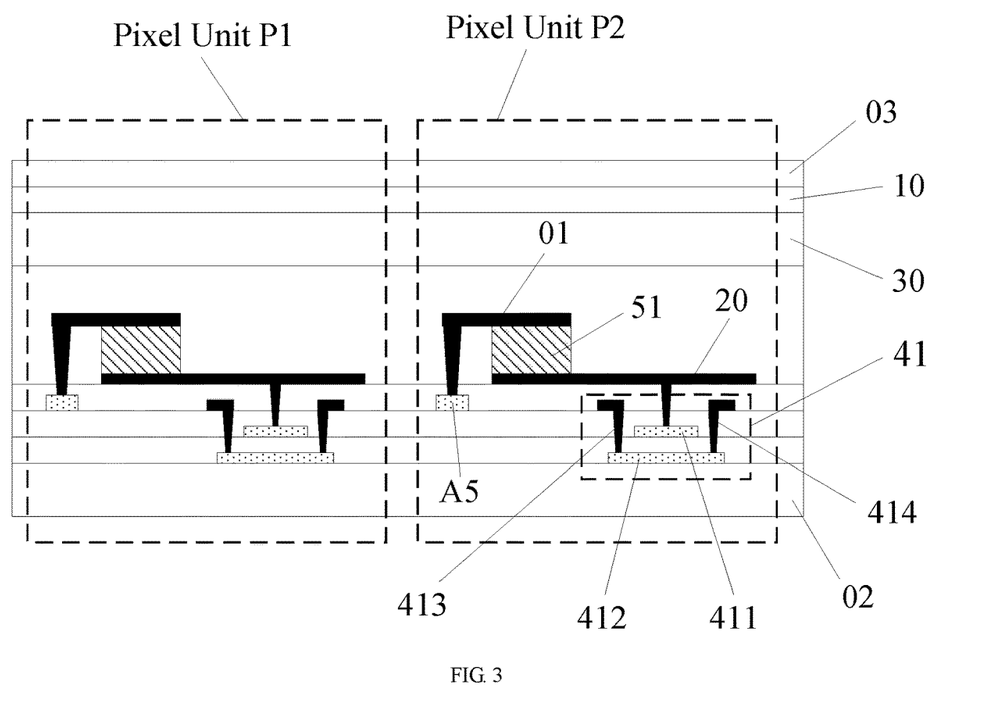
FIG. 3 is a schematic diagram of a fingerprint identification device provided by an embodiment of the present disclosure.

An embodiment of the present disclosure further provides a fingerprint identification device. Referring to FIG. 3, the fingerprint identification device in the present embodiment includes a plurality of ultrasonic fingerprint identification circuits according to the above embodiments. For example, the receiving electrodes 20 of the plurality of ultrasonic fingerprint identification circuits can be arranged separately from each other, and the transmitting electrode 10 can be a common electrode of the plurality of ultrasonic fingerprint identification circuits.

As shown in FIG. 3, the cathode of the photodiode 51 can be connected with the first fixed electric level A5 through a metal lead 01. The anode of the photodiode 51 can be connected with the receiving electrode 20, and the anode of the photodiode 51 can also be connected with the gate electrode 411 of the first thin film transistor 41 through the receiving electrode 20. Referring to FIG. 3, the first thin film transistor 41 further includes an active layer 412, a first electrode 413 of the first thin film transistor 41 and a second electrode 414 of the first thin film transistor 41, wherein the active layer 412 is formed on a substrate 02.

In addition, the fingerprint identification device can further include a protective layer 03, and the protective layer 03 is disposed on a side of the transmitting electrode 10 away from the piezoelectric layer 30.

It should be noted that FIG. 3 only shows partial structures of the photosensitive unit and the signal output unit, and other structures in the ultrasonic fingerprint identification circuit are not shown in FIG. 3.

Figure 4:
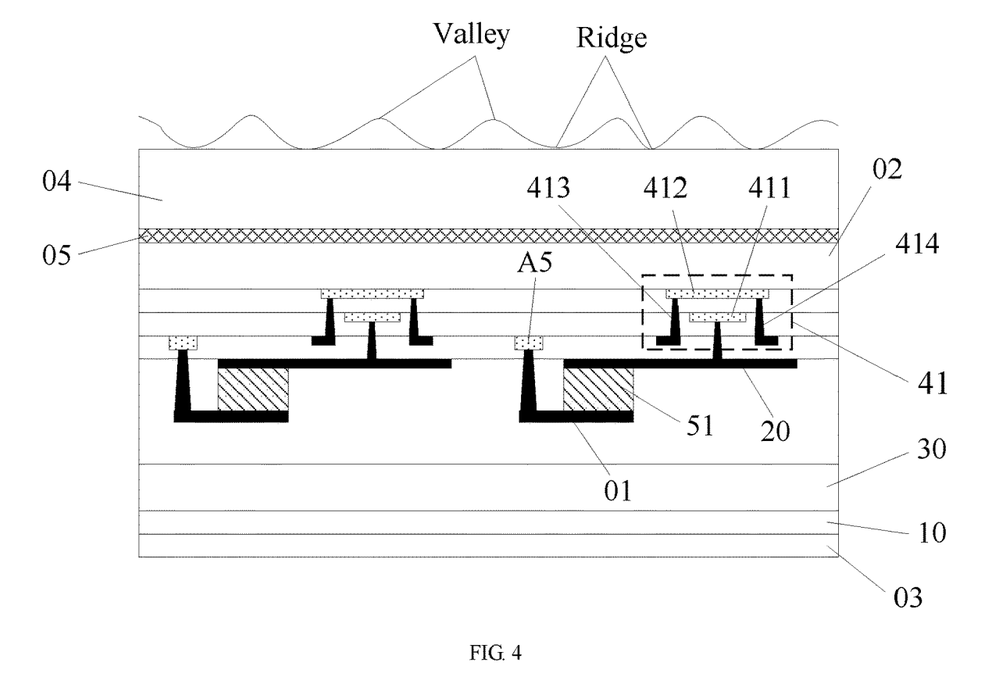
FIG. 4 is a schematic diagram of a fingerprint identification device attached with a display module provided by an embodiment of the present disclosure.

Optionally, referring to FIG. 4, the fingerprint identification device can be attached with a display module 04. In practical application, the fingerprint identification device can be arranged close to the substrate 02 of the display module. In practical application, the fingerprint identification device can be bonded with the display module 04 by an adhesive layer 05. For example, the receiving electrodes 20 can be arranged in one-to-one correspondence with pixel units included in the display module, that is, one ultrasonic fingerprint identification circuit can correspond to one pixel unit. For example, for the two ultrasonic fingerprint identification circuits shown in FIG. 3, one can correspond to the pixel unit P1 and the other can correspond to the pixel unit P2.

In the embodiment of the present disclosure, the anode of the photosensitive unit can be connected with the receiving electrode, and the cathode of the photosensitive unit can be connected with the first fixed electric level, so that the photosensitive unit is in a reverse bias state. The fingerprint can reflect light while reflecting the ultrasonic signal, and therefore, the photosensitive unit can generate an optical signal in response to the light reflected by the fingerprint and the first fixed electric level. The optical signal can be superimposed with the first valley signal or the first ridge signal obtained by the receiving electrode based on the ultrasonic signal reflected by the fingerprint, thereby obtaining a superimposed second valley signal or a superimposed second ridge signal. Because the amount of light reflected by the valley in the fingerprint is greater than the amount of light reflected by the ridge in the fingerprint, the signal difference between the second valley signal and the second ridge signal will be greater than the signal difference between the first valley signal and the first ridge signal. In this way, the difference between the second valley signal and the second ridge signal can be widened, thus improving the accuracy of fingerprint identification.

It should be noted here that, although not shown in the drawings, in order to realize an under-screen fingerprint detection function, the substrate 02, the adhesive layer 05, the emitting anode of the light emitting unit in the display module 04 and/or other potential thin film packages can be at least partially transparent or translucent, and a light transmission gap can be formed between adjacent pixel units (e.g., the pixel units P1 and P2 in FIG. 3) in the pixel unit array of the display module 04, so that the light reflected by the fingerprint on the surface of the display module 04 can be incident on the piezoelectric layer 30 of the fingerprint identification device through the transparent/translucent film layers and the light transmission gap, so as to obtain a fingerprint image.

An embodiment of the present disclosure further provides a driving method of the ultrasonic fingerprint identification circuit. For example, FIG. 5 shows a flowchart of an example of the driving method of the ultrasonic fingerprint identification circuit in the present embodiment. Referring to FIG. 5, the method in the present embodiment can include the following step 501.

Step 501: In the transmitting stage, the reset stage and the receiving stage, maintaining the cathode of the photosensitive unit to be connected with the first fixed electric level, so that the photosensitive unit is in the reverse bias state.

For example, the anode of the photosensitive unit can be connected with the receiving electrode, and the cathode of the photosensitive unit can be connected with the first fixed electric level. Therefore, the cathode of the photosensitive unit can be maintained to be connected with the first fixed electric level in the transmitting stage, the reset stage and the receiving stage, so that the photosensitive unit is in a reverse bias state in each stage.

While reflecting the ultrasonic signal, the fingerprint also reflects a part of light, such as the light emitted by the display module. Therefore, in the receiving stage, the photosensitive unit can generate an optical signal based on the first fixed electric level in response to the light reflected by the fingerprint, and the optical signal can be superimposed with the first valley signal or the first ridge signal generated by the ultrasonic fingerprint identification circuit based on the ultrasonic signal reflected by the fingerprint, so as to obtain a superimposed second valley signal or a superimposed second ridge signal. Furthermore, the amount of light reflected by the valley in the fingerprint is greater than the amount of light reflected by the ridge in the fingerprint. Therefore, the intensity of the optical signal generated by light reflected by the valley in the fingerprint is greater than the intensity of the optical signal generated by light reflected by the ridge in the fingerprint, so the signal difference between the second valley signal and the second ridge signal will be greater than the signal difference between the first valley signal and the first ridge signal. In this way, the difference between the second valley signal and the second ridge signal will be widened, thus improving the accuracy of fingerprint identification.

In the embodiment of the present disclosure, in the transmitting stage, the reset stage and the receiving stage, the cathode of the photosensitive unit can be maintained to be connected with the first fixed electric level, so that the photosensitive unit is in a reverse bias state. In the receiving stage, the fingerprint can reflect light while reflecting the ultrasonic signal, and therefore, the photosensitive unit can generate an optical signal in response to the light reflected by the fingerprint and the first fixed electric level in the receiving stage. The optical signal can be superimposed with the first valley signal or the first ridge signal obtained by the receiving electrode based on the ultrasonic signal reflected by the fingerprint, thereby obtaining a superimposed second valley signal or a superimposed second ridge signal. Because the amount of light reflected by the valley in the fingerprint is greater than the amount of light reflected by the ridge in the fingerprint, the signal difference between the second valley signal and the second ridge signal will be greater than the signal difference between the first valley signal and the first ridge signal. In this way, the difference between the second valley signal and the second ridge signal can be widened, thus improving the accuracy of fingerprint identification.

Figure 7:
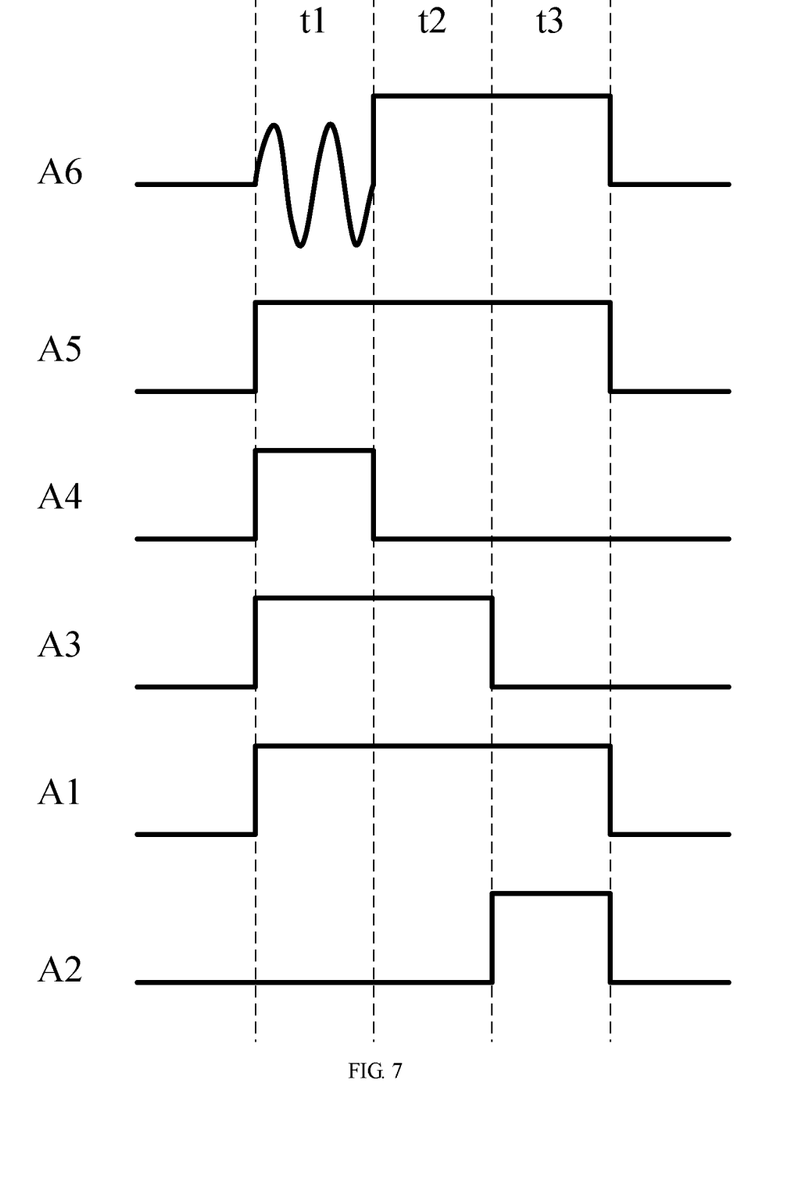
FIG. 7 is a timing diagram of an ultrasonic fingerprint identification circuit provided by an embodiment of the present disclosure.

FIG. 6 shows a flowchart of another example of the driving method of the ultrasonic fingerprint identification circuit provided by an embodiment of the present disclosure, and FIG. 7 shows a timing diagram of the driving method of the ultrasonic fingerprint identification circuit shown in FIG. 6. Referring to FIG. 6 and FIG. 7, the method in the present embodiment can include the following steps 601-603.

Step 601: In the transmitting stage, maintaining the cathode of the photosensitive unit to be connected with the first fixed electric level, so that the photosensitive unit is in the reverse bias state; receiving the alternating current signal through the transmitting electrode, inputting the second voltage to the receiving electrode through an input unit, and transmitting the ultrasonic signal in response to the alternating current signal at the transmitting electrode and the second voltage at the receiving electrode through the piezoelectric layer.

In this step, referring to FIG. 1 and FIG. 7, in the transmitting stage t1, the photosensitive unit 50 can be maintained to be connected with the first fixed electric level A5, so that the photosensitive unit 50 is in a reverse bias state. Meanwhile, in this stage, an alternating current signal can be input to the transmitting electrode 10 through the sixth voltage input terminal A6, so that the transmitting electrode 10 can receive the alternating current signal. Moreover, in the transmitting stage t1, the second voltage Vref1 can be input to the input unit 60 through the third voltage input terminal A3, and the sixth voltage Vgate2 for turning on the input unit 60 can be input to the input unit 60 through the fourth voltage input terminal A4, so that the input unit 60 inputs the second voltage Vref1 to the receiving electrode 20.

In the transmitting stage t1, the piezoelectric layer 30 can transmit an ultrasonic signal in response to the alternating current signal at the transmitting electrode 10 and the second voltage Vref1 at the receiving electrode 20. The ultrasonic signal can reach a user's finger through respective film layers, and the ridge part and the valley part of the fingerprint can reflect the ultrasonic signal.

In addition, in the transmitting stage t1, the fourth voltage Vcc can be input to the first electrode of the first thin film transistor 41 in the signal output unit 40 through the first voltage input terminal A1. Meanwhile, a low level can also be input to the gate electrode of the second thin film transistor 42 through the second voltage input terminal A2, so that the signal output unit 40 is in an off state. It should be noted that the voltages input to the gate electrode of the first thin film transistor 41 in the transmitting stage t1, the reset stage t2 and the receiving stage t3 do not exceed the threshold voltage of the first thin film transistor 41, respectively.

Optionally, in practical application, the voltage of the alternating current signal at the transmitting electrode 10 can be greater than or equal to −200V and less than or equal to +200V. For example, the alternating current signal can be a sine wave signal of ±50V or ±100V. The second voltage Vref1 can be greater than or equal to 1V and less than or equal to 10V. And the value of the sixth voltage Vgate2 is not specifically limited in the embodiments of the present disclosure, as long as the sixth voltage Vgate2 is greater than the threshold voltage of the input unit 60.

In practical application, the first fixed electric level needs to be greater than the second voltage Vref1, so that the photosensitive unit 50 is in a reverse bias state. For example, the first fixed electric level can be greater than 10V, without being specifically limited in the embodiments of the present disclosure.

It should be noted that each voltage signal shown in FIG. 7 is intended to illustrative timing sequence only, and the amplitude of each voltage signal is not limited to that shown in FIG. 7.

Step 602: In the reset stage, maintaining the cathode of the photosensitive unit to be connected with the first fixed electric level, so that the photosensitive unit is in the reverse bias state, inputting a first voltage to the piezoelectric layer through the transmitting electrode, and resetting the receiving electrode through the reset unit.

After the ultrasonic signal is transmitted, the reset stage t2 is entered, and the reset unit 70 can reset the receiving electrode 20 in this stage. Before the ultrasonic signal reflected by the fingerprint reaches the receiving electrode 20, an ultrasonic signal may be reflected back by other film layers between the fingerprint and the receiving electrode, and therefore, the receiving electrode 20 can be reset in the reset stage t2 before the receiving stage t3, thus avoiding the influence of noise signals reflected by other film layers to be acted on the receiving of the ultrasonic signal reflected by the fingerprint.

For example, referring to FIG. 1 and FIG. 7, in the reset stage t2, the photosensitive unit 50 can be maintained to be connected with the first fixed electric level A5, so that the photosensitive unit 50 is in a reverse bias state. Meanwhile, in this stage, that is, after the ultrasonic signal is transmitted, the first voltage can be input to the transmitting electrode 10 through the sixth voltage input terminal A6. Moreover, a low level can be input to the input unit 60 through the fourth voltage input terminal A4, so that the input unit 60 is in an off state, and meanwhile the reset unit 70 can reset the receiving electrode 20.

For example, the step of resetting the receiving electrode 20 through the reset unit 70 can include: inputting a third voltage Vref2 to the reset unit 70; and inputting the third voltage Vref2 to the receiving electrode 20 through the reset unit 70 to reset the receiving electrode 20. That is, in the reset stage t2, the third voltage Vref2 can be input to the reset unit 70 through the third voltage input terminal A3, so that the reset unit 70 can be turned on, and the reset unit 70 in the on state can input the third voltage Vref2 to the receiving electrode 20 to reset the receiving electrode 20.

In addition, in the reset stage t2, the fourth voltage Vcc can be continuously input to the first electrode of the first thin film transistor 41 in the signal output unit 40 through the first voltage input terminal A1. And a low level can also be input to the gate electrode of the second thin film transistor 42 through the second voltage input terminal A2, so that the signal output unit 40 is in an off state.

In actual application, the third voltage Vref2 can be greater than the second voltage Vref1, so that the third voltage Vref2 can pull up the electric level of the receiving electrode 20, thereby realizing the reset operation.

In addition, in practical application, the first fixed electric level can be greater than the third voltage Vref2, so that the photosensitive unit 50 can be always in the reverse bias state in the receiving stage t1 and the reset stage t2.

Step 603: In the receiving stage, maintaining the cathode of the photosensitive unit to be connected with the first fixed electric level, so that the photosensitive unit is in the reverse bias state, inputting the first voltage to the piezoelectric layer through the transmitting electrode, generating a first valley signal or a first ridge signal in response to the ultrasonic signal reflected by a fingerprint and the first voltage through the piezoelectric layer, outputting the first valley signal or the first ridge signal to the signal output unit through the receiving electrode, generating an optical signal in response to light reflected by the fingerprint and the first fixed electric level through the photosensitive unit, outputting the optical signal to the signal output unit through the receiving electrode, and outputting a second valley signal obtained by superimposing the first valley signal and the optical signal or a second ridge signal obtained by superimposing the first ridge signal and the optical signal through the signal output unit, wherein the first fixed electric level is greater than the second voltage.

Referring to FIG. 1 and FIG. 7, in the receiving stage t3, a low level can be continuously input to the input unit 60 through the fourth voltage input terminal A4, so as to maintain the input unit 60 in an off state. Meanwhile, a low level can be input to the reset unit 70 and the input unit 60 through the third voltage input terminal A3; moreover, the fourth voltage Vcc can be continuously input to the first electrode of the first thin film transistor 41 in the signal output unit 40 through the first voltage input terminal A1; and a low level can be input to the gate electrode of the second thin film transistor 42 through the second voltage input terminal A2, so that the signal output unit 40 is in an on state. Thus, the signal output unit can receive the signal and output it through the output terminal B1.

As shown in FIG. 1 and FIG. 7, in the receiving stage t3, the first voltage can be continuously input to the transmitting electrode 10 through the sixth voltage input terminal A6, and at this time, the piezoelectric layer 30 can generate a first valley signal or a first ridge signal in response to the ultrasonic signal reflected by the fingerprint and the first voltage, and output the first valley signal or the first ridge signal to the signal output unit 40 through the receiving electrode 20.

In the receiving stage t3, the photosensitive unit 50 can be maintained to be connected with the first fixed electric level A5. In this stage, when the photosensitive unit 50 receives light, the electric level at the receiving electrode 20 near the photosensitive unit 50 can be raised by the first fixed electric level, thereby generating an optical signal, and then the photosensitive unit 50 outputs the optical signal to the signal output unit 40 through the receiving electrode 20. Accordingly, the signal output unit 40 can receive a second valley signal formed by superimposing the first valley signal and the optical signal or a second ridge signal formed by superimposing the first ridge signal and the optical signal.

The amount of light reflected by the valley in the fingerprint is greater than the amount of light reflected by the ridge in the fingerprint. Therefore, the intensity of the optical signal generated by light reflected by the valley in the fingerprint is greater than the intensity of the optical signal generated by light reflected by the ridge in the fingerprint, so the signal difference between the second valley signal and the second ridge signal will be greater than the signal difference between the first valley signal and the first ridge signal. In this way, the difference between the second valley signal and the second ridge signal will be widened, thus improving the accuracy of fingerprint identification.

In the embodiment of the present disclosure, the first fixed electric level can be input to the photosensitive unit in the transmitting stage, the reset stage, and the receiving stage. In the receiving stage, the fingerprint can reflect light while reflecting the ultrasonic signal, and therefore, the photosensitive unit can generate an optical signal in response to the light reflected by the fingerprint and the first fixed electric level in the receiving stage. The optical signal can be superimposed with the first valley signal or the first ridge signal obtained by the receiving electrode based on the ultrasonic signal reflected by the fingerprint, thereby obtaining a superimposed second valley signal or a superimposed second ridge signal. Because the amount of light reflected by the valley in the fingerprint is greater than the amount of light reflected by the ridge in the fingerprint, the signal difference between the second valley signal and the second ridge signal will be greater than the signal difference between the first valley signal and the first ridge signal. In this way, the difference between the second valley signal and the second ridge signal can be widened, thus improving the accuracy of fingerprint identification.

In order to simplify the description, the aforementioned method embodiments are expressed as a series of action combinations, but those skilled in the art should know that the present invention is not limited by the described action sequence, because according to the present invention, some steps can be performed in other sequences or at the same time. Secondly, those skilled in the art should also know that the embodiments described in the specification are all preferred embodiments, and the actions and modules involved may not be necessary for the present invention.

All the embodiments in the specification are described in a progressive way, and each embodiment focuses on the differences from other embodiments. The same and similar parts among the embodiments can be referred to each other.

The ultrasonic fingerprint identification circuit, the driving method thereof and the fingerprint identification device provided by the present disclosure are exemplarily introduced in combination with several embodiments. In this paper, specific examples are applied to illustrate the principle and implementation of the present disclosure, and the description of the above embodiments is only used to assist in understanding the method and conception of the present invention; meanwhile, according to the conception of the present invention, there will be some changes in the specific implementation and application scope for those skilled in the art. In summary, the contents of the specification should not be construed as limiting the present invention.

The present application claims priority to Chinese patent application No. 201910501914.9, filed on Jun. 11, 2019, the entire disclosure of which is incorporated herein by reference as part of the present application.

What is claimed is:

1. An ultrasonic fingerprint identification circuit, comprising: a transmitting electrode; a receiving electrode; a piezoelectric layer disposed between the transmitting electrode and the receiving electrode; a signal output unit; and a photosensitive unit, wherein
   the transmitting electrode is configured to receive an alternating current signal in a transmitting stage;
   the receiving electrode is connected with the signal output unit and is applied with a second voltage in the transmitting stage;
   the piezoelectric layer is configured to transmit an ultrasonic signal in response to the alternating current signal at the transmitting electrode and the second voltage at the receiving electrode, in the transmitting stage; and
   an anode of the photosensitive unit is connected with the receiving electrode, and a cathode of the photosensitive unit is connected with a first fixed electric level, so that the photosensitive unit is in a reverse bias state.

2. The ultrasonic fingerprint identification circuit according to claim 1, wherein the ultrasonic fingerprint identification circuit further comprises an input unit and a reset unit; the input unit is connected with the receiving electrode; the reset unit is connected with the receiving electrode;
   the transmitting electrode is further configured to input a first voltage to the piezoelectric layer in a reset stage and a receiving stage;
   the input unit is configured to input the second voltage to the receiving electrode in the transmitting stage, and the first fixed electric level is greater than the second voltage;
   the piezoelectric layer is further configured to generate a first valley signal or a first ridge signal in response to the ultrasonic signal reflected by a fingerprint and the first voltage in the receiving stage, and to output the first valley signal or the first ridge signal to the signal output unit through the receiving electrode;
   the reset unit is configured to reset the receiving electrode in the reset stage;
   the photosensitive unit is configured to generate an optical signal in response to light reflected by the fingerprint and the first fixed electric level in the receiving stage, and to output the optical signal to the signal output unit through the receiving electrode; and
   the signal output unit is configured to output a second valley signal obtained by superimposing the first valley signal and the optical signal or output a second ridge signal obtained by superimposing the first ridge signal and the optical signal, in the receiving stage.

3. The ultrasonic fingerprint identification circuit according to claim 2, wherein the signal output unit comprises a first thin film transistor and a second thin film transistor, a first electrode of the first thin film transistor is connected with a first voltage input terminal, a gate electrode of the first thin film transistor is connected with the receiving electrode, a second electrode of the first thin film transistor is connected with a first electrode of the second thin film transistor, a gate electrode of the second thin film transistor is connected with a second voltage input terminal, a second electrode of the second thin film transistor is connected with an output terminal of the signal output unit, wherein
the first voltage input terminal is configured to input a fourth voltage Vcc to the first electrode of the first thin film transistor in the transmitting stage, the reset stage and the receiving stage; and
the second voltage input terminal is configured to input a fifth voltage to the gate electrode of the second thin film transistor in the receiving stage to turn on the second thin film transistor.

4. The ultrasonic fingerprint identification circuit according to claim 3, wherein the photosensitive unit comprises at least one photosensitive diode, an anode of each of the at least one photosensitive diode is connected with the receiving electrode, the anode of each of the at least one photosensitive diode is further connected with the gate electrode of the first thin film transistor, and a cathode of each of the at least one photosensitive diode is connected with the first fixed electric level.

5. The ultrasonic fingerprint identification circuit according to claim 4, wherein the at least one photodiode is a PIN-type photodiode.

6. The ultrasonic fingerprint identification circuit according to claim 2, wherein the input unit comprises a third thin film transistor, a first electrode of the third thin film transistor is connected with the receiving electrode, a second electrode of the third thin film transistor is connected with a third voltage input terminal, and a gate electrode of the third thin film transistor is connected with a fourth voltage input terminal, wherein
the fourth voltage input terminal is configured to input a sixth voltage to the gate electrode of the third thin film transistor in the transmitting stage to turn on the third thin film transistor; and
the third voltage input terminal is configured to input the second voltage to the receiving electrode through the third thin film transistor in a case where the third thin film transistor is turned on.

7. The ultrasonic fingerprint identification circuit according to claim 6, wherein the reset unit comprises a non-photosensitive diode, a cathode of the non-photosensitive diode is connected with the receiving electrode, and an anode of the non-photosensitive diode is connected with the third voltage input terminal, and
the third voltage input terminal is further configured to input a third voltage into the non-photosensitive diode in the reset stage, so as to input the third voltage into the receiving electrode through the non-photosensitive diode, wherein the third voltage is greater than the second voltage.

8. The ultrasonic fingerprint identification circuit according to claim 1, wherein a material of the piezoelectric layer comprises at least one selected from the group consisting of polyvinylidene fluoride (PVDF), aluminum nitride (AlN), lead zirconate titanate (PZT) and zinc oxide (ZnO).

9. A fingerprint identification device, comprising a plurality of ultrasonic fingerprint identification circuits according to claim 1, wherein receiving electrodes of the plurality of ultrasonic fingerprint identification circuits are arranged separately from each other.

10. The fingerprint identification device according to claim 9, wherein the fingerprint identification device comprises a substrate, the plurality of ultrasonic fingerprint identification circuits are arranged on one side of the substrate, and a display module is attached to one side of the substrate away from the plurality of ultrasonic fingerprint identification circuits, and
the receiving electrodes of the plurality of ultrasonic fingerprint identification circuits are arranged in one-to-one correspondence with pixel units included in the display module.

11. The fingerprint identification device according to claim 10, wherein the plurality of ultrasonic fingerprint identification circuits share an output terminal of the signal output unit.

12. The fingerprint identification device according to claim 9, wherein the plurality of ultrasonic fingerprint identification circuits share an output terminal of the signal output unit.

13. The fingerprint identification device according to claim 9, wherein the ultrasonic fingerprint identification circuit further comprises an input unit and a reset unit; the input unit is connected with the receiving electrode; the reset unit is connected with the receiving electrode;
the transmitting electrode is further configured to input a first voltage to the piezoelectric layer in a reset stage and a receiving stage;
the input unit is configured to input the second voltage to the receiving electrode in the transmitting stage, and the first fixed electric level is greater than the second voltage;
the piezoelectric layer is further configured to generate a first valley signal or a first ridge signal in response to the ultrasonic signal reflected by a fingerprint and the first voltage in the receiving stage, and to output the first valley signal or the first ridge signal to the signal output unit through the receiving electrode;
the reset unit is configured to reset the receiving electrode in the reset stage;
the photosensitive unit is configured to generate an optical signal in response to light reflected by the fingerprint and the first fixed electric level in the receiving stage, and to output the optical signal to the signal output unit through the receiving electrode; and
the signal output unit is configured to output a second valley signal obtained by superimposing the first valley signal and the optical signal or output a second ridge signal obtained by superimposing the first ridge signal and the optical signal, in the receiving stage.

14. The fingerprint identification device according to claim 13, wherein the signal output unit comprises a first thin film transistor and a second thin film transistor, a first electrode of the first thin film transistor is connected with a first voltage input terminal, a gate electrode of the first thin film transistor is connected with the receiving electrode, a second electrode of the first thin film transistor is connected with a first electrode of the second thin film transistor, a gate electrode of the second thin film transistor is connected with a second voltage input terminal, a second electrode of the second thin film transistor is connected with an output terminal of the signal output unit, wherein the first voltage input terminal is configured to input a fourth voltage Vcc to the first electrode of the first thin film transistor in the transmitting stage, the reset stage and the receiving stage; and the second voltage input terminal is configured to input a fifth voltage to the gate electrode of the second thin film transistor to turn on the second thin film transistor in the receiving stage.

15. The fingerprint identification device according to claim 14, wherein the photosensitive unit comprises at least one photosensitive diode, an anode of each of the at least one photosensitive diode is connected with the receiving electrode, the anode of each of the at least one photosensitive diode is further connected with the gate electrode of the first thin film transistor, and a cathode of each of the at least one photosensitive diode is connected with the first fixed electric level.

16. A driving method of an ultrasonic fingerprint identification circuit, the ultrasonic fingerprint identification circuit comprising a transmitting electrode; a receiving electrode; a piezoelectric layer disposed between the transmitting electrode and the receiving electrode; a signal output unit; and a photosensitive unit, wherein the receiving electrode is connected with the signal output unit; and an anode of the photosensitive unit is connected with the receiving electrode, and a cathode of the photosensitive unit is connected with a first fixed electric level, the driving method comprising: a transmitting state, a reset stage and a receiving stage, and in the transmitting stage, the reset stage and the receiving stage, maintaining the cathode of the photosensitive unit to be connected with the first fixed electric level, so that the photosensitive unit is in reverse bias state.

17. The driving method of the ultrasonic fingerprint identification circuit according to claim 16, further comprising:

in the transmitting stage, receiving an alternating current signal through the transmitting electrode, inputting a second voltage to the receiving electrode through an input unit, and transmitting an ultrasonic signal in response to the alternating current signal at the transmitting electrode and the second voltage at the receiving electrode through the piezoelectric layer;

in the reset stage, inputting a first voltage to the piezoelectric layer through the transmitting electrode, and resetting the receiving electrode through the reset unit; and in the receiving stage, inputting the first voltage to the piezoelectric layer through the transmitting electrode, generating a first valley signal or a first ridge signal in response to the ultrasonic signal reflected by a fingerprint and the first voltage through the piezoelectric layer, outputting the first valley signal or the first ridge signal to the signal output unit through the receiving electrode, generating an optical signal in response to light reflected by the fingerprint and the first fixed electric level through the photosensitive unit, outputting the optical signal to the signal output unit through the receiving electrode, and outputting a second valley signal obtained by superimposing the first valley signal and the optical signal or a second ridge signal obtained by superimposing the first ridge signal and the optical signal through the signal output unit, wherein the first fixed electric level is greater than the second voltage.

18. The driving method of the ultrasonic fingerprint identification circuit according to claim 17, wherein resetting the receiving electrode through the reset unit comprises:

inputting a third voltage to the reset unit; and inputting the third voltage to the receiving electrode through the reset unit to reset the receiving electrode.

19. The driving method of the ultrasonic fingerprint identification circuit according to claim 18, wherein the third voltage is greater than the second voltage.

20. The driving method of the ultrasonic fingerprint identification circuit according to claim 18, wherein the first fixed electric level is greater than the third voltage.

* * * * *